(12) United States Patent
Lohner et al.

(10) Patent No.: US 7,305,292 B2
(45) Date of Patent: Dec. 4, 2007

(54) COORDINATION OF A VEHICLE DYNAMICS CONTROL SYSTEM WITH OTHER VEHICLES STABILITY SYSTEMS

(75) Inventors: Herbert Lohner, Friolzheim (DE); Ansgar Traechtler, Ditzingen-Hirschlanden (DE); Sylvia Futterer, Ludwigsburg (DE); Armin Verhagen, Schwieberdingen (DE); Karlheinz Frese, Illingen (DE); Manfred Gerdes, Vaihingen/Enz (DE); Martin Sackmann, Schwieberdingen (DE); Dietmar Martini, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 256 days.

(21) Appl. No.: 11/101,810

(22) Filed: Apr. 8, 2005

(65) Prior Publication Data

US 2005/0228565 A1    Oct. 13, 2005

(30) Foreign Application Priority Data

Apr. 8, 2004    (DE) ...................... 10 2004 017 385

(51) Int. Cl.
*G06F 17/00* (2006.01)
(52) U.S. Cl. ........................... 701/41; 701/48; 701/70; 701/71; 701/72; 701/38; 303/140; 303/146
(58) Field of Classification Search .................. 701/41, 701/48, 70, 71, 38, 72; 303/140, 146
See application file for complete search history.

(56) References Cited

U.S. PATENT DOCUMENTS

| | | | |
|---|---|---|---|
| 5,455,770 A * | 10/1995 | Hadeler et al. ................ 701/70 |
| 5,488,562 A * | 1/1996 | Otterbein et al. .............. 701/38 |
| 5,809,444 A * | 9/1998 | Hadeler et al. ................ 701/72 |
| 5,832,402 A * | 11/1998 | Brachert et al. ............... 701/72 |
| 5,845,222 A * | 12/1998 | Yamamoto et al. ............ 701/41 |
| 5,991,669 A * | 11/1999 | Dominke et al. ............... 701/1 |
| 6,092,815 A * | 7/2000 | Rutz et al. ................ 280/5.505 |
| 6,226,581 B1 * | 5/2001 | Reimann et al. .............. 701/48 |
| 6,266,599 B1 * | 7/2001 | Van Zanten et al. .......... 701/71 |
| 6,594,563 B1 * | 7/2003 | Ding ............................ 701/34 |
| 6,918,638 B2 * | 7/2005 | Schneider et al. ........... 303/140 |
| 6,922,621 B2 * | 7/2005 | Kodama et al. ............... 701/41 |
| 7,008,026 B2 * | 3/2006 | Baumgarten ................. 303/146 |
| 7,162,333 B2 * | 1/2007 | Koibuchi et al. ............... 701/1 |
| 7,181,326 B2 * | 2/2007 | Lin et al. ...................... 701/41 |
| 2004/0024505 A1 * | 2/2004 | Salib et al. .................... 701/38 |
| 2004/0158377 A1 * | 8/2004 | Matsumoto et al. .......... 701/48 |
| 2004/0162654 A1 * | 8/2004 | Lu et al. ....................... 701/38 |
| 2005/0004732 A1 * | 1/2005 | Berry et al. .................. 701/48 |
| 2005/0125122 A1 * | 6/2005 | Knoop et al. ................. 701/36 |
| 2005/0228565 A1 * | 10/2005 | Lohner et al. ................ 701/41 |
| 2005/0256622 A1 * | 11/2005 | Futterer et al. ............... 701/48 |

\* cited by examiner

*Primary Examiner*—Thomas Black
*Assistant Examiner*—Wae Lenny Louie
(74) *Attorney, Agent, or Firm*—Kenyon & Kenyon LLP

(57) ABSTRACT

Described is a device for stabilizing a vehicle in critical driving situations, including a vehicle dynamics control system having a control unit, including a vehicle dynamics control algorithm, and at least one actuator and an additional vehicle stability system having an associated actuator. Vehicle dynamics control may be executed in a particularly simple and trouble-free manner when the vehicle dynamics control algorithm is retrofitted with a distribution function which derives an actuating request for an actuator of the vehicle dynamics control system as well as an actuating request for at least one actuator of the vehicle stability system from a controller output variable.

7 Claims, 6 Drawing Sheets

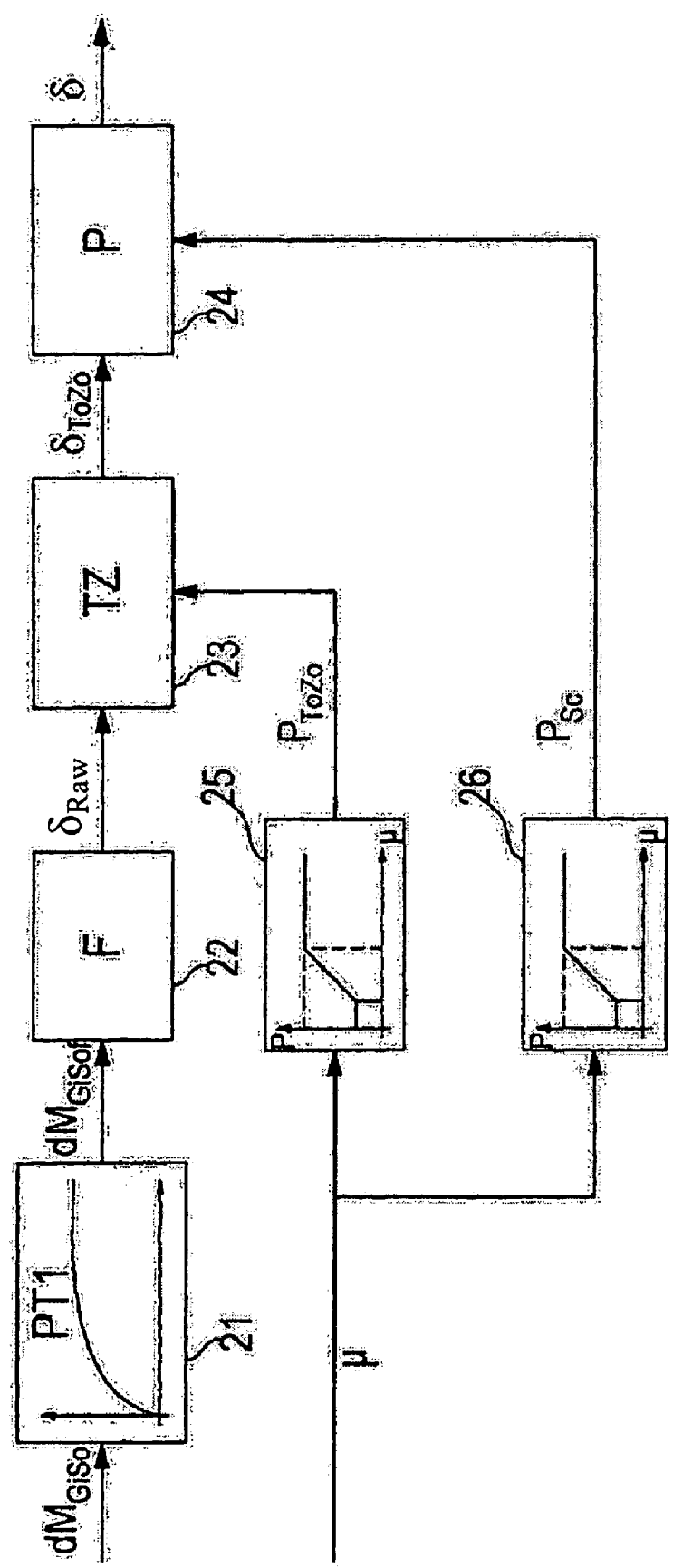

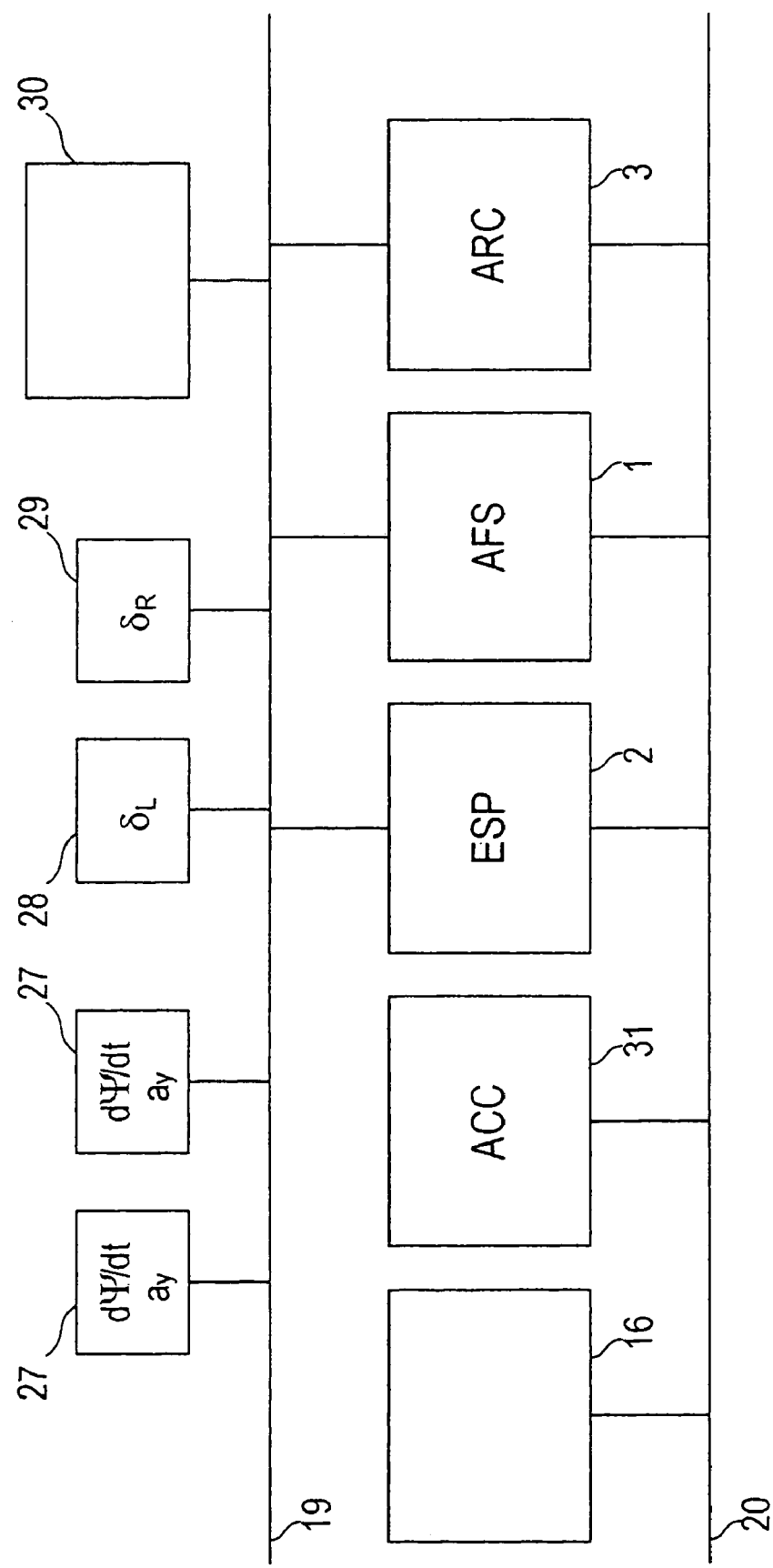

COORDINATION OF A VEHICLE DYNAMICS CONTROL SYSTEM WITH OTHER VEHICLES STABILITY SYSTEMS

FIELD OF THE INVENTION

The present invention relates to a vehicle dynamics control system.

BACKGROUND INFORMATION

Vehicle dynamics control systems, such as the ESP (electronic stability program), are used to improve the controllability of motor vehicles in critical driving situations, e.g., during oversteering when cornering, and to stabilize the vehicle. Known vehicle dynamics control systems include a control unit which includes a control algorithm for executing a float angle regulation and/or a yaw speed regulation, as well as a series of sensors which provide measured values about the vehicle's current driving state. Different setpoint variables are calculated from the driver inputs, in particular the steering wheel position, the accelerator pedal position, and the brake operation. If the deviation of the vehicle's actual behavior from its setpoint behavior is too great, the vehicle dynamics control system intervenes in the driving operation and creates a compensating yaw moment which counters the vehicle's yaw motion. For this purpose, the vehicle dynamics control system normally uses the vehicle brakes and/or the engine management as actuators.

In addition to a vehicle dynamics control system, modern vehicles oftentimes also include other systems which may also intervene in the driving operation for the purpose of vehicle stabilization, such as an active steering system AFS (active front steering), an active chassis ARC (active roll compensation), or a system for actively influencing the tire properties. Such systems are referred to in the following as "vehicle stability systems." They normally include their own control electronics (control unit) and their own actuators, such as a steering actuator, via which the steering angle may be adjusted, an active spring-and-shock-absorber unit for influencing the tire contact forces, or other actuators via which the vehicle's handling properties may be influenced.

SUMMARY OF THE INVENTION

The mentioned vehicle stability systems also determine different setpoint values of driving state variables, such as a setpoint yaw rate or a setpoint float angle, and calculate from the deviation a necessary stabilizing intervention, such as a change in the steering angle or a change in the wheel contact force on predefined wheels. The calculated values are implemented via the appropriate actuators and influence the vehicle's handling properties. Since the vehicle dynamics control system ESP as well as the other vehicle stability systems (e.g., AFS, ARC) execute stabilizing interventions, it is possible for the systems to constrain or block one another.

FIG. 1 shows a controller structure for a stability system known from the related art which has an active steering system AFS and an active chassis ARC in addition to a vehicle dynamics control system ESP. Systems ESP, AFS, and ARC each include a separate control unit 1, 2, 3 which each include a control algorithm 4, 5, 6. Algorithms 4-6 each include in a known manner an "observer" B in which different state variables, such as the float angle or the wheel slip angle, are estimated, a unit So for calculating setpoint values of the regulation, a setpoint yaw rate for example, and a state controller ZR which generates a controller output variable y which is converted into an actuating request for different actuators 8. Controller output variables ya-yc are transferred to appropriate actuators 8 or associated electronics 1, 3 via interfaces 7. Vehicle 10 forms the control path of the control system.

The driving state is recorded by different sensors which are combined here in a block 11. The corresponding sensor signals are supplied as actual values to algorithms 4-6 of control systems AFS, ESP, ARC.

Such a parallel controller structure has the disadvantage that multiple control algorithms 4-6 are present, at least partially. This is an expensive proposition since, in addition to the control algorithms, the necessary security software must also be implemented several times. Moreover, individual control systems AFS, ESP, ARC may pursue different control targets, thereby constraining or blocking one another.

Therefore, it is the object of the present invention to create a method and a device for stabilizing a vehicle in critical driving situations which have a particularly simple design and operate reliably.

The object of the present invention is achieved by the features specified in Claim 1 and Claim 8. Further embodiments of the present invention are the object of the subclaims.

A fundamental aspect of the present invention is to create an advanced vehicle dynamics control system (VDM) which, in addition to the brake system and the engine management, is able to also address other actuators, and to provide this system with only one single control algorithm which generates one controller output variable (e.g., a yaw moment) from which an actuating request for an actuator (i.e., the brake system or the engine management) of the vehicle dynamics control system as well as for an actuator (e.g., a steering actuator or an active spring-and-shock-absorber unit) of at least one additional vehicle stability system is derived. This has the substantial advantage that only one central control algorithm is present, and its controller output variable is implemented by one or multiple actuators. Such a central control is particularly easily implementable and particularly safe and reliable.

The appropriate control algorithm may be implemented, for example, in the control unit of the vehicle dynamics control system (e.g., ESP). The previously present vehicle dynamics control algorithm (ESP) needs to be only marginally retrofitted and adjusted for this purpose. No separate stability control is to be carried out in the additional vehicle stability systems, such as AFS or ARC.

The control algorithm of the advanced vehicle dynamics control system (VDM) preferably includes a distribution unit which generates from a controller output variable an actuating request for an actuator (i.e., the brake system or the engine management) of the vehicle dynamics control system as well as an actuating request for an actuator of an additional vehicle stability system.

The vehicle stability system may include, for example, an active steering system (AFS), an active chassis system (ARC), and/or another system which, for vehicle stabilization purposes, may actively intervene in the driving operation.

The control algorithm preferably includes a yaw rate controller; in this case, the controller output variable would be a yaw moment or a variable proportional thereto.

According to a preferred embodiment of the present invention, the distribution unit is implemented in such a way that an actuating request for a first actuator (e.g., an active spring-and-shock-absorber unit) is derived from the controller output variable, and that a residual value of the controller output variable is determined from the controller output variable and the actuating request actually implementable by the actuator, and that an actuating request for a second actuator (e.g., a steering actuator) is generated from the residual value. This means that the part of the control intervention which cannot be implemented by the first actuator (e.g., an active spring-and-shock-absorber unit) is implemented by a second actuator (e.g., an active steering system or an active brake system) or by additional actuators if needed.

BRIEF DESCRIPTION OF THE DRAWINGS

FIG. 5 shows the calculation of a superimposed steering angle from the controller output variable.

FIG. 6 shows an example of a hardware architecture for an advanced vehicle dynamics control system.

DETAILED DESCRIPTION

Figure 1:
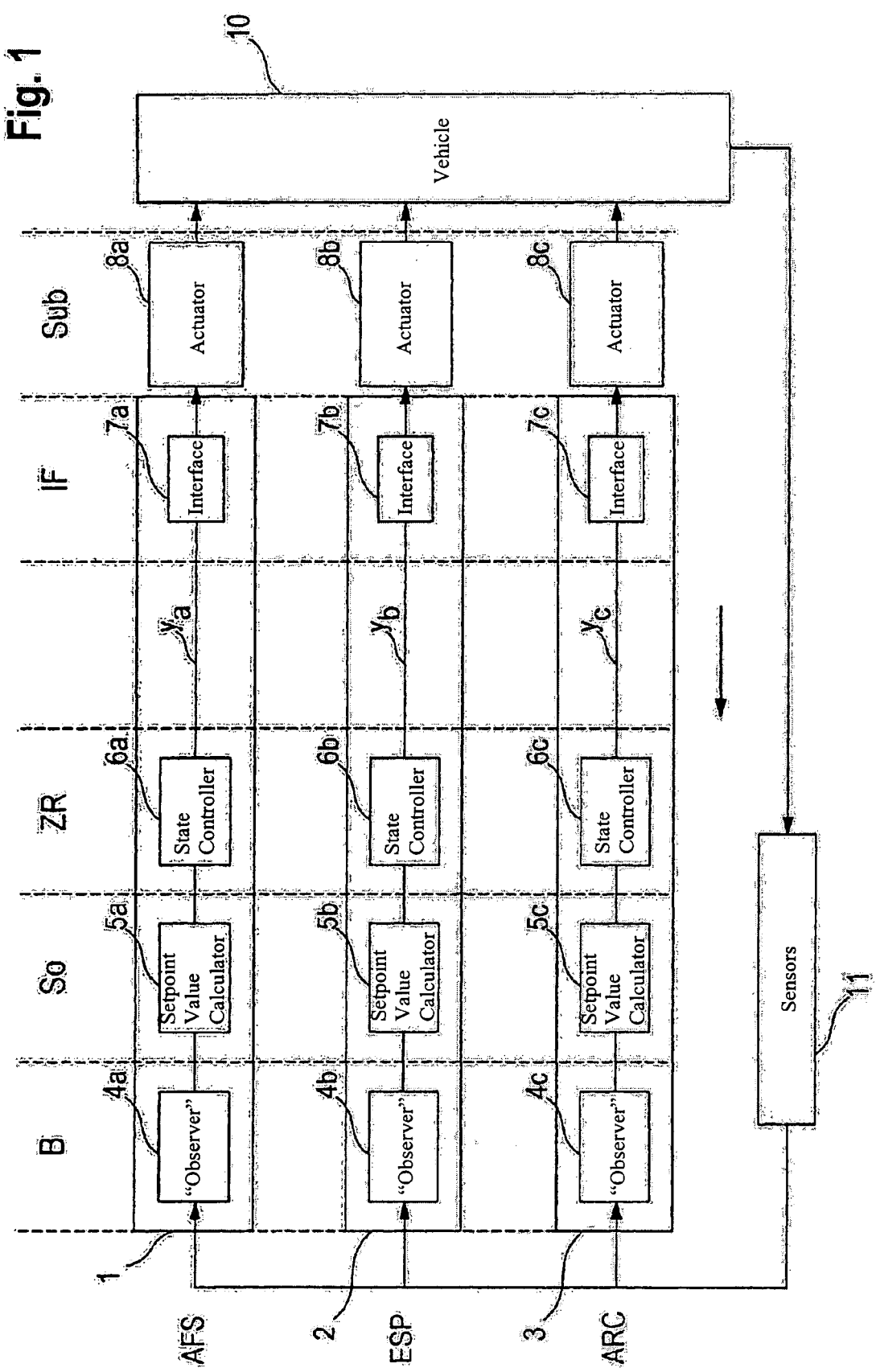
FIG. 1 shows a vehicle dynamics control system known from the related art having control algorithms which operate in parallel.

Regarding the explanation of FIG. 1, reference is made to the preamble of the description.

Figure 2:
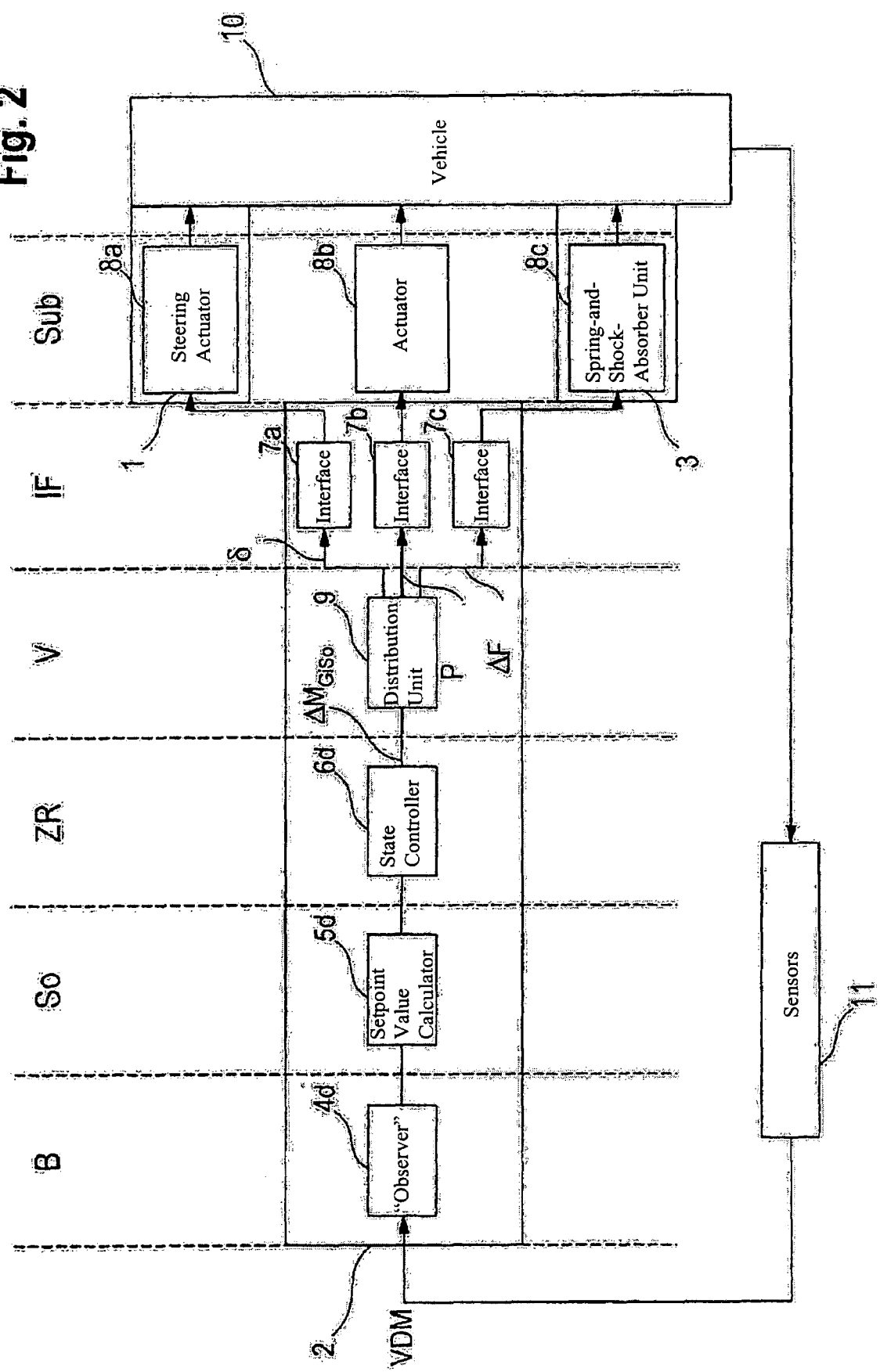
FIG. 2 shows an advanced vehicle dynamics control system having additional actuators.

FIG. 2 shows an advanced vehicle dynamics control system VDM which has the ability, for vehicle stabilization purposes, to control additional actuators—steering actuator 8a of an active steering system and spring-and-shock-absorber unit 8c of an active chassis in this case—in addition to the vehicle's engine management and brake systems. The vehicle dynamics control system includes a control algorithm which is schematically depicted by blocks 4d-6d.

Reference numeral 4d indicates an "observer," reference numeral 5d indicates a unit for the setpoint value calculation which determines a setpoint yaw rate in particular, and reference numeral 6d indicates a state controller whose controller output variable $\Delta M_{GiSo}$ is a yaw moment or a variable proportional thereto.

The control algorithm also includes a distribution unit 9 which converts controller output variable $\Delta M_{GiSo}$ into different actuating requests $\Delta F_{Nstab}$, $\delta_{stab}$, $M_{stab}$, where $\Delta F_{Nstab}$ is a change in the wheel contact force, $\delta_{stab}$ is a superimposed steering angle, and $P_{wheelsetpoint}$ is a brake force. The individual actuating requests are transferred to control units 1, 3 of active steering system AFS, active chassis ARC, and the electronics of an active brake system 8b via interfaces 7a-7c. Control units 1, 2 subsequently control corresponding actuators 8a, 8c. The modified actual state of vehicle 10 is recorded via a sensor 11.

Unlike known vehicle dynamics control algorithms (e.g., ESP), this advanced system VDM may address one or multiple different actuators 8 without coming into conflict with other systems. The vehicle's handling properties may be influenced by controlling steering actuator 8a or an active spring-and-shock-absorber unit 8c.

Since the additional stability systems (AFS, ARC, etc.) influence the vehicle's handling properties, information about the state of these actuators 8, such as information about the actual steering angle or information about the calibration of spring-and-shock-absorber unit 8c, must be supplied to control algorithm 4d-6d. Vehicle dynamics control algorithm 4d-6d would otherwise carry out the control on the basis of wrong parameters (e.g., only based on the steering wheel angle, but not based on the steering angle at the wheel), which may result in erroneous brake and engine interventions.

Figure 3:
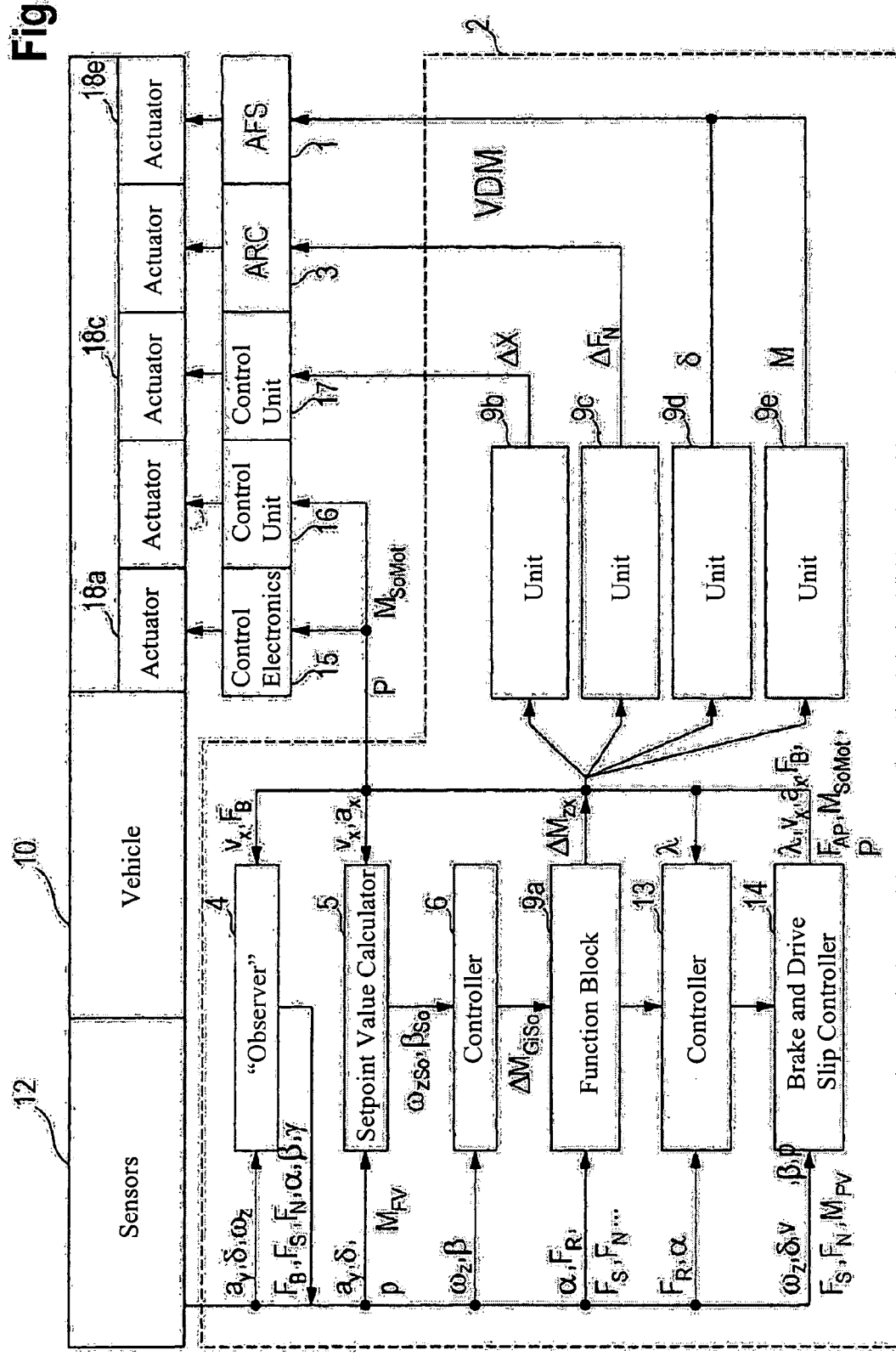
FIG. 3 shows a detailed view of the vehicle dynamics control system of FIG. 2.

FIG. 3 shows an advanced vehicle dynamics control system VDM in detail. The overall system includes vehicle 10 as the control path, sensors 12 for determining the controller input variables, actuators 18a-18e for influencing the handling properties, as well as a hierarchically structured controller 4, 5, 6, 9a, 13, 14 including a superimposed vehicle dynamics controller 6 (state controller) and a subordinate brake and drive slip controller 14. The controller functions are implemented in control unit 2 of vehicle dynamics control system ESP in the form of software.

The configuration and the function of such a vehicle dynamics controller are widely known from the related art so that only the essential functions and in particular the differences with respect to known controllers are discussed in the following. The actual values of the regulated state variables (yaw speed, float angle) are determined in "observer" 4. The setpoint values of the state variables are calculated in a unit 5 for the setpoint value calculation.

Superimposed controller 6 carries out a yaw speed and/or float angle regulation in a known manner and generates a controller output variable $\Delta M_{GiSo}$ in the form of a yaw moment or a variable proportional thereto. Part of controller output variable $\Delta M_{GiSo}$ is converted into a setpoint slip $\lambda_{So}$ and supplied to subordinate brake and drive slip controller 14. Setpoint slip $\lambda_{So}$, calculated for the individual wheels, is converted into corresponding instructions $P_{wheelsetpoint}$, $M_{So\text{-}Mot}$ for the actuators "brake hydraulics" 18a and "engine management" 18b which adjust the required brake and drive forces on the individual wheels. Another part of controller output variable $\Delta M_{GiSo}$ is converted into moments $\Delta M_{zx}$ which are implemented by actuators 18c-18e of additional subsystems (AFS, SRC, etc.). The distribution of controller output variable $\Delta M_{GiSo}$ to individual subsystems 1, 3, 15-18e may basically be adjusted in any way, depending on how forceful the intervention of the individual subsystems should be. The vehicle dynamics control system is designed in such a way that the control intervention may be implemented by one or multiple subsystems 18a-18e.

In this case, the subsystems include an active steering system AFS having a control unit 1 and a steering actuator 18e, an active chassis having a control unit 3 and an actuator 18d, a further optional subsystem having a control unit 17 and an associated actuator 18c, an engine management having a control unit (Motronic) 16 and an actuator 18b, and a brake system having electronics 15 and brake hydraulics 18a as actuators.

Unlike known vehicle dynamics control systems, the vehicle dynamics controller includes a function block 9a-9e which is used to distribute controller output variable $\Delta M_{GiSo}$ to subsystems 1, 3, 15-18e. For this purpose, block 9a initially generates partial variables $\Delta M_{zx}$ from controller output variable $\Delta M_{GiSo}$, partial variables $\Delta M_{zx}$ being implemented by actuators 18a-18c of subsystems AFS, ESP, ARC, etc. Partial variables $\Delta M_{zx}$ are calculated by units 9b-9e into corresponding actuating requests, such as a change in wheel contact force $\Delta F_{Nstab}$ for a wheel, a superimposed steering angle $\delta_{stab}$, a steering torque $M_{stab}$, or another control value $\Delta X$ for another optional subsystem 17, 18c.

Individual actuating requests $P_{wheelsetpoint}$, $M_{SoMot}$, $\Delta X$, $\Delta F_{Nstab}$, $\delta_{stab}$, $M_{stab}$ are supplied to control units 1, 3, 17 and control electronics 15, 16 via predefined interfaces (not shown). Actuating requests $P_{wheelsetpoint}$, $M_{SoMot}$, $\Delta X$, $\Delta FN_{stab}$, $\delta_{stab}$, $M_{stab}$ are subsequently converted into corresponding electrical control signals for individual actuators 18a-18e.

Necessary control intervention $\Delta M_{GiSo}$ may basically be distributed in any way to the different subsystems 1, 3, 15-18e. However, a larger part of the overall control intervention is preferably assigned to individual systems, such as an active suspension ARC, than to other systems.

Figure 4:
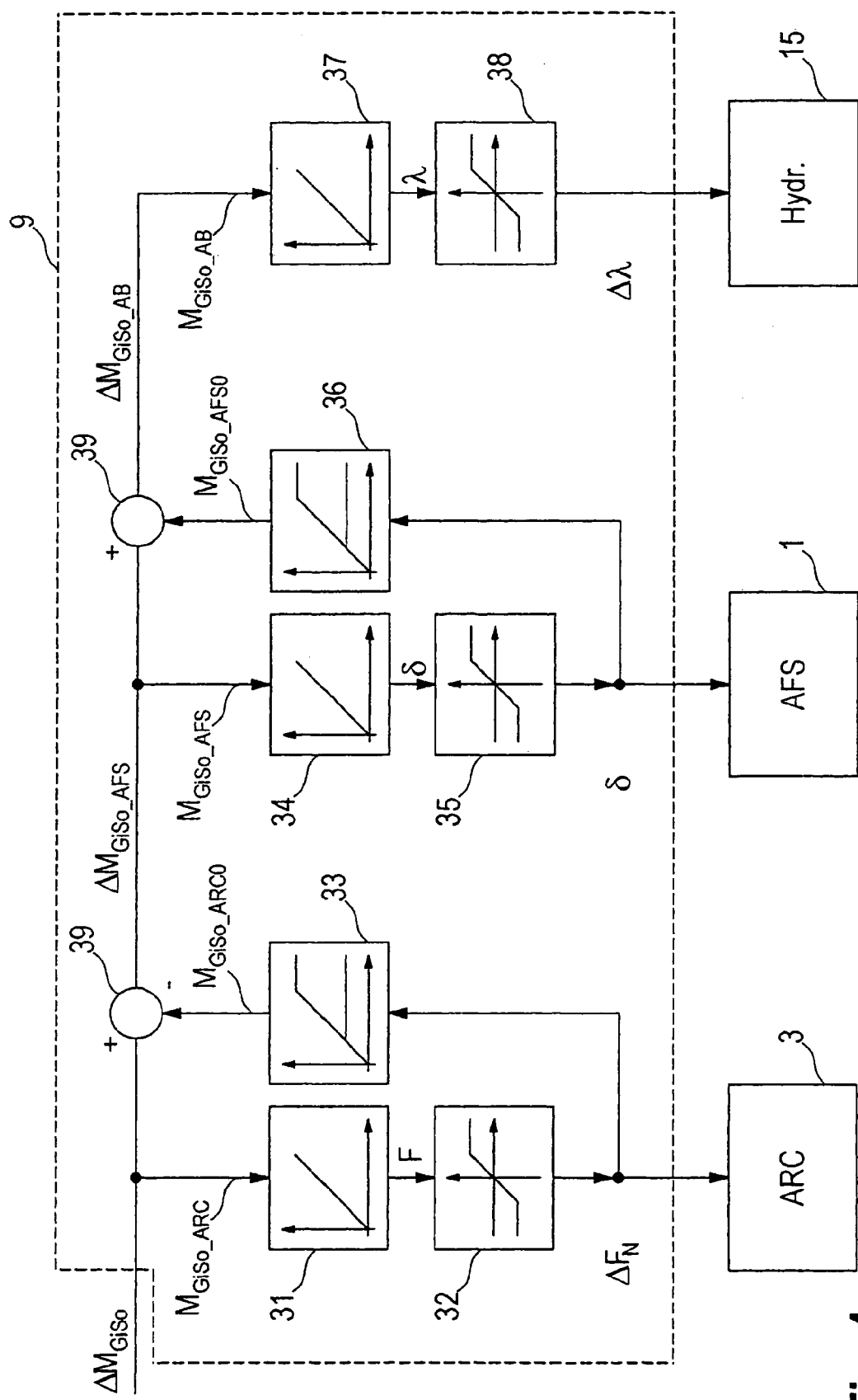
FIG. 4 shows an exemplary embodiment of a unit for distributing the controller output variable.

FIG. 4 shows a preferred embodiment of a distribution unit 9 which converts controller output variable $\Delta M_{GiSo}$ into multiple actuating requests $\Delta FN_{stab}$, $\delta_{stab}$, $\Delta \lambda$ for different subsystems 1, 3, 15. Controller output variable $\Delta M_{GiSo}$ is initially converted into wheel contact forces F for the individual wheels of vehicle 10 using a unit 31. Downstream unit 32 limits calculated values F if the values are not able to be implemented directly for reasons of the efficiency of active suspension ARC 3. For this purpose, values F and/or their gradient are/is reduced when predefined limits are exceeded. Resulting actuating request $\Delta FN_{stab}$ may thus accept only values which are able to be implemented by actuator 18d of the active suspension.

Value $\Delta FN_{stab}$ is conveyed to active suspension 3 where a corresponding control intervention is effected. The part of controller output variable $\Delta M_{GiSo}$ which is not able to be implemented by active chassis 3 is determined as a residual value $\Delta M_{GiSo\_AFS}$. A unit 33 is provided for this purpose which converts the implementable actuating request $\Delta FN_{stab}$ back into a variable $\Delta M_{GiSo\_ARCO}$ of the unit of controller output variable $\Delta M_{GiSo}$. At node 39, the difference between controller output variable $\Delta M_{GiSo}$ and estimated variable $\Delta M_{GiSo\_ARCO}$ is calculated and residual value $\Delta M_{GiSo\_AFS}$ is formed.

Residual value $\Delta M_{GiSo\_AFS}$ in turn is subsequently converted into an actuating request $\delta_{stab}$ for steering actuator 18e of an active steering system AFS 1 via a unit 34. If needed, this value $\delta_{stab}$ is limited via a unit 35. Actuating request $\delta_{stab}$ (in this case a superimposed steering angle) is supplied to active steering system 1 and to a unit 36 which determines the part which is able to be implemented by active steering system AFS 1.

A residual value $\Delta M_{GiSo\_AB}$, which is supplied to active brake system 15, is in turn calculated from setpoint request $\Delta M_{GiSo\_AFS}$ and the actually implementable request $\Delta M_{GiSo\_AFSO}$. This residual moment $\Delta M_{GiSo\_AB}$ is converted into a wheel slip $\lambda$ via a unit 37 and limited via unit 38. Resulting setpoint slip $\lambda_{stab}$ is finally converted by active brake system 15 into a corresponding brake intervention.

The distribution of controller output variable $\Delta M_{GiSo}$ is illustrated here as an example for only three different subsystems 1, 3, 15. The control intervention may basically be distributed to any number of subsystems in any sequence.

Another embodiment of a distribution unit 9 may be implemented, for example, in such a way that controller output variable $\Delta M_{GiSo}$ is supplied to multiple subsystems 1, 3, 15-18e and implemented in a weighted manner. Depending on the preference, subsystems 1, 3, 15-18e may take on different portions, e.g., 60% by the active suspension ARC, 30% by the active steering system AFS, and 10% by brake system 15.

FIG. 5 shows the calculation of superimposed steering angle $\delta_{stab}$ from controller output variable $\Delta M_{GiSo}$ as it may be carried out in control unit 2, for example. Controller output variable $\Delta M_{GiSo}$ is initially supplied to a low-pass filter 21 and a filtered variable $\Delta M_{GiSof}$ is generated. This variable $\Delta M_{GiSof}$ is converted into a steering angle $\delta_{Raw}$ via a unit 22. This raw value $\delta_{Raw}$ is again bandwidth-limited in downstream unit 23 and a value $\delta_{ToZo}$ is generated. The bandwidth of filter 23 is dependent on friction factor $\mu$ which is incorporated in filter function F via a characteristic curve 25. Block 25 generates a parameter $P_{ToZo}$ which changes filter function F as a function of friction factor $\mu$.

Filtered steering angle $\delta_{ToZo}$ is finally scaled using a unit 24, whereby the superimposed steering angle, i.e., steering angle change $\delta_{stab}$ to be set, is maintained. The scaling is in turn dependent on friction factor $\mu$ which is incorporated in scaling function 24 via a characteristic curve 26.

FIG. 6 shows a possible hardware architecture for the advanced vehicle dynamics control system VDM. The system includes two data buses 19, 20, multiple sensors 27-30 as well as different control units 1, 2, 3 being connected to first bus 19, also known as the chassis CAN. Indicated control units 1, 2, 3 are also connected to the other data bus 20, also known as the power train CAN. An engine management (Motronic) 16 and a control unit 31 for a speed controller ACC are additionally connected to data bus 20.

The sensors include redundantly embodied yaw speed and transverse acceleration sensors 27, a steering wheel angle sensor 28, and a steering angle sensor 29, as well as additional optional sensors 30. Actuating requests $\Delta F_{Nstab}$, $\delta_{stab}$, $\Delta \lambda$ for active steering system AFS 1, active chassis ARC 3, and possibly additional subsystems 17 generated by VDM control unit 2 are preferably conveyed via bus 19, since this bus is typically less overloaded and carries fewer interference signals than power train CAN 20.

LIST OF REFERENCE NUMERALS

1 AFS control unit
2 VDM control unit
3 ARC control unit
4 observer
5 setpoint value calculation
6 state controller
7 interfaces
8 subsystems
9 distribution unit
10 vehicle
11 sensor signals
12 sensors
13 setpoint slip and blocking moment calculation
14 brake and drive slip controller
15 hydraulic control
16 motronic
17 control unit
18 actuators
19 chassis CAN
20 power train CAN
21 low-pass filter
22 conversion unit
23 filter
24 scaling unit
25 characteristic curve
26 characteristic curve
27 yaw speed and transverse acceleration sensors
28 steering wheel angle sensor
29 steering angle sensor
30 optional sensor
31 conversion unit
32 limiting unit
33 estimator 34 conversion unit
35 limiting unit
36 estimator
37 conversion unit
38 limiting unit
Y controller output variable
$M_{GiSo}$ yaw setpoint moment
$\Delta F_{Nstab}$ change in the wheel contact force
$\delta_{stab}$ steering angle change
$M_{stab}$ steering moment
$\Delta X$ actuating request

What is claimed is:

1. A device for stabilizing a vehicle in a critical driving situation, comprising:
   a vehicle dynamics control system including a control unit, in which a vehicle dynamics control algorithm is stored, and at least one first actuator; and
   a vehicle stability system having at least one second actuator, wherein:
      the vehicle dynamics control algorithm generates a controller output variable from which a first actuating request for the at least one first actuator and a second actuating request for the at least one second actuator is derived; and
      the vehicle dynamics control algorithm includes a distribution unit that generates the first actuating request and the second actuating request from the controller output variable, the distribution unit implemented in such a way that:
         the first actuating request is derived from the controller output variable,
         a residual value of the controller output variable is determined from the controller output variable and the first actuating request, and
         the second actuating request is determined from the residual value.

2. The device as recited in claim 1, wherein the vehicle stability system includes one of:
   an active steering system,
   an active chassis system, and
   a system for actively intervening in a driving operation for vehicle stabilization purposes.

3. The device as recited in claim 1, wherein the controller output variable includes one of a yaw moment and a variable proportional to the yaw moment.

4. The device as recited in claim 1, wherein:
   the at least one first actuator includes a spring-and-shock-absorber unit of an active chassis, and
   the at least one second actuator includes a steering actuator of an active steering system.

5. The device as recited in claim 1, wherein:
   the control unit of the vehicle dynamics control system and a control unit of the vehicle stability system are connected to two buses, and
   the first actuating request is transmitted from the control unit of the vehicle dynamics control system to the control unit of the vehicle stability system via the bus to which sensors of the vehicle dynamics control system are connected.

6. A method for stabilizing a vehicle in a critical driving situation, the vehicle including a vehicle dynamics control system that includes a first control unit and a first actuator, the vehicle including a vehicle stability system that includes a second control unit and a second actuator, comprising:
   performing a yaw rate regulation;
   generating a controller output variable; and
   deriving a first actuating request for the first actuator and a second actuating request for the second actuator from the controller output variable; wherein
      the first actuating request is derived from the controller output variable,
      a residual value of the controller output variable is determined from the controller output variable and the first actuating request, and
      the second actuating request is determined from the residual value.

7. The method as recited in claim 6, wherein:
   the vehicle stability system includes an active steering system, and
   a steering wheel angle and an actual steering angle at a wheel of the vehicle are supplied to the first control unit.

* * * * *